United States Patent [19]
Cheung

[11] Patent Number: 5,615,065
[45] Date of Patent: Mar. 25, 1997

[54] PHASE-COMPENSATED SERVO PATTERN AND POSITION ERROR-SENSING DETECTOR

[75] Inventor: Wayne L. Cheung, San Jose, Calif.

[73] Assignee: International Business Machines Corporation, Armonk, N.Y.

[21] Appl. No.: 317,942

[22] Filed: Oct. 4, 1994

[51] Int. Cl.⁶ .................................................. G11B 5/596
[52] U.S. Cl. ..................................... 360/77.08; 360/78.14
[58] Field of Search ........................... 360/77.02, 77.03, 360/77.05, 77.06, 77.07, 77.08, 77.11, 78.14

[56] References Cited

U.S. PATENT DOCUMENTS

| | | | |
|---|---|---|---|
| 3,427,606 | 2/1969 | Black et al. | 360/77.11 |
| 3,458,785 | 7/1969 | Sordello | 360/77.11 |
| 4,488,188 | 12/1984 | Hansen et al. | 360/77.11 |
| 4,490,756 | 12/1984 | Dost et al. | 360/77.11 |
| 4,549,232 | 10/1985 | Axmear et al. | 360/77.07 |
| 4,587,579 | 5/1986 | Cocke et al. | 360/77.03 X |
| 4,589,037 | 5/1986 | Jen et al. | 360/77.08 X |
| 4,598,327 | 7/1986 | Jen et al. | 360/77.08 X |
| 4,616,276 | 10/1986 | Workman . | |
| 4,642,562 | 2/1987 | Collins et al. | 360/77.08 |
| 4,679,103 | 7/1987 | Workman . | |
| 4,977,472 | 12/1990 | Volz et al. . | |
| 5,072,318 | 12/1991 | Yu . | |
| 5,343,340 | 8/1994 | Boutaghou et al. | 360/77.08 |
| 5,381,359 | 1/1995 | Abbott et al. | 360/40 X |
| 5,442,498 | 8/1995 | Cheung et al. | 360/77.08 |

FOREIGN PATENT DOCUMENTS 60-140522  7/1985  Japan .

OTHER PUBLICATIONS

S. A. Raghavan, "Fast and Accurate Computation of the Amplitude of Quadrature Pairs," IBM Technical Disclosure Bulletin, vol. 34, No. 4B, Sep. 1991, pp. 46–47.

Primary Examiner—Aristotelis Psitos
Assistant Examiner—James L. Habermehl
Attorney, Agent, or Firm—Baker, Maxham, Jester & Meador

[57] ABSTRACT

A demodulator for a servo control system receives a servo signal that is produced from reading a servo pattern that comprises a repeating sequence of trigonometric-compensated, phase-encoded magnetic flux transitions that extend continuously across the width of a servo track and includes a burst cosine phase detector that samples the amplitude of the servo signal at regular intervals and produces burst sample data, from which the demodulator produces a position error signal that is a substantially linear function of the servo head position relative to the servo track width. Because a plurality of amplitude samples is taken from each cycle of the servo signal, an increased signal-to-noise ratio can be obtained for the servo signal. The superior signal characteristics permit smaller and less complex demodulator elements to be used, thereby reducing the overall servo control system complexity. The burst cosine phase detector multiplies the servo signal samples with a predetermined set of reference coefficients to produce a linear phase difference that indicates the servo head radial position.

19 Claims, 13 Drawing Sheets

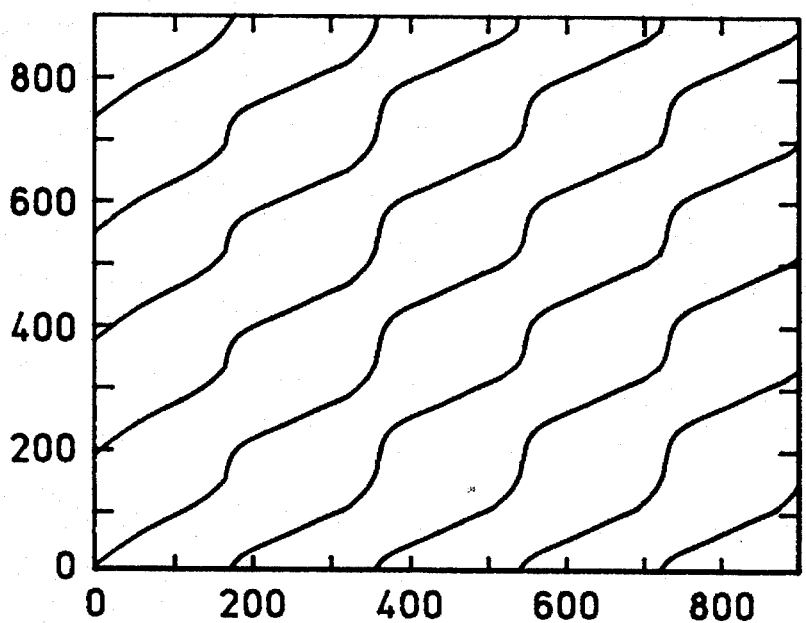
FIG. 8(A)   PHASE INPUT
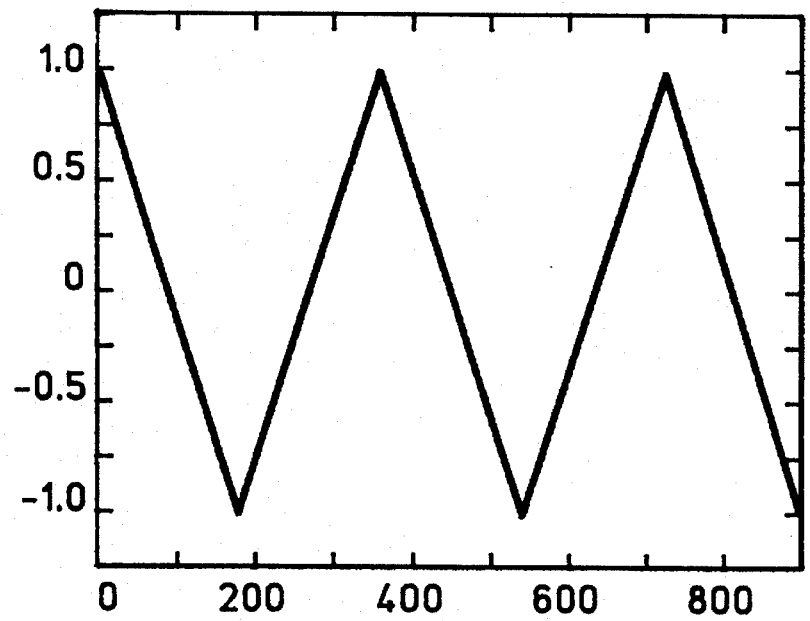
FIG. 8(B)   PHASE DETECTOR OUTPUT

PHASE-COMPENSATED SERVO PATTERN AND POSITION ERROR-SENSING DETECTOR

BACKGROUND OF THE INVENTION

1. Field of the Invention

This invention relates generally to magnetic head servo control systems and, more particularly, to disk drive position signal demodulator systems to determine the location of a read/write head relative to disk tracks.

2. Description of the Related Art

In conventional computer data storage systems having a rotating storage medium, such as a magnetic or magneto-optical disk, data is stored in a series of concentric or spiral tracks across the surface of the disk. A magnetic disk can comprise, for example, a disk substrate having a surface on which a magnetic material is deposited. The data stored on a disk is represented as a series of variations in magnetic orientation of the disk magnetic material. The variations in magnetic orientation, generally comprising reversals of magnetic flux, represent binary digits of ones and zeros that in turn represent data. The binary digits must be read from and recorded onto the disk surface by a magnetic transducer comprising a read/write head that is suspended over the disk surface in close proximity to the disk. That is, the read/write head can produce and detect variations in magnetic orientation of the magnetic material as the disk rotates relative to the head.

Conventionally, the read/write head is mounted on a disk arm that is moved across the disk by a servo. A disk drive servo control system controls movement of the disk arm across the surface of the disk to move the read/write head from data track to data track and, once over a selected track, to maintain the head in a path over the centerline of the selected track. Maintaining the head centered over a track facilitates accurate reading and recording of data in the track.

The servo control system maintains the read/write head in a position centered over a track by reading servo information recorded onto the disk surface. The servo information comprises a servo pattern of high frequency magnetic flux transitions, generally flux reversals, that are pre-recorded in disk servo tracks. The servo pattern flux reversals are distributed about the centerline of each servo track and, when read by a servo read head, provide a signal that is a function of the location and orientation of flux reversals in the track located beneath the servo head. The signal thereby provides an indication of the direction and extent of head movement required to maintain the head centered about the track.

A servo read head, which can be the same head used for reading the binary data or can be a dedicated servo pattern read head, detects the servo pattern as the disk rotates and also produces servo track information. The servo track information includes track identification data that provides the number of the track from which the information was produced and also includes an analog servo signal that provides information on the position of the servo read head relative to the track. The analog servo signal is demodulated by servo control system circuitry to produce a position error signal that is used to control the disk arm servo. In this way, the servo control system detects the number of the track over which the servo read head is positioned and controls movement of the servo head relative to the track. Those skilled in the art will appreciate that the servo read head is located in a fixed position relative to the data read/write head and therefore controlling the position of the servo head also controls the position of the data head.

There are a variety of methods for providing servo track information to a disk servo control system. In a method referred to as the dedicated servo method, the entire surface of one side of a disk is pre-recorded with dedicated servo track information. A servo head is positioned over the dedicated servo disk surface in a fixed relationship relative to data read/write heads positioned over one or more other data disk surfaces. The position of the servo head relative to the dedicated disk surface is used to indicate the position of the multiple data read/write heads relative to their respective disk surfaces. The dedicated servo method is most often used with multiple disk systems in which a servo head of a single dedicated servo disk surface controls movement of corresponding data read/write heads of a multiple-platter disk drive. It should be apparent that a dedicated servo system for a single disk system would use one-half of the available disk surface area for servo information only and therefore would not be especially efficient.

Another method of providing servo track information is known as the sector servo method. In the sector servo method, each disk surface includes servo track information and binary data recorded in concentric or spiral tracks. The tracks on a sector servo disk surface are divided into radial sectors having a short servo track information area followed by a data area. The servo track information area includes a sector marker, track identification data, and a servo burst pattern. The sector marker indicates to the data read/write head that servo information immediately follows in the track. Again, the servo read head can be the same head used for reading data or can be a separate, dedicated servo head.

The sector servo method is more efficient than the dedicated servo method for low profile disk drives with fewer disks in the configuration, because a single read/write head can be used to obtain servo information and to read and record data from the disk and because less of the disk surface area is used for servo information as compared with the dedicated servo method. As users demand greater storage capacities from low profile disk systems, manufacturers provide less and less disk area for servo information by decreasing sector length and track width. To obtain the same amount of servo information in less disk area, the servo information must be recorded at higher and higher frequencies. The higher frequencies increase the difficulty of writing and reading the servo information.

In both the dedicated servo and sector servo methods, the analog servo signal is produced as the servo pattern is read from the disk and is demodulated to provide an indication of the servo head position relative to the inside and outside diameters of the disk. The demodulated servo signal is commonly referred to as a position error signal (PES) and is used to generate a corrective input signal that is applied to the read/write head positioning servo. The remaining description assumes the sector servo system, but the manner in which the sector servo description can be applied to dedicated servo systems should be clear to those skilled in the art.

Conventionally, the phase-encoded servo pattern read by the servo read head comprises one or more radial and/or slant patterns formed by magnetic transitions aligned across the servo track in the disk radial direction. The phase-encoded servo pattern generally includes either an area or burst of radial lines that are followed by an area of angled or slanted magnetic transitions, or two sequential opposed slant patterns. A conventional combination radial line and slant phase pattern is illustrated in FIG. 1 and a conventional chevron-shaped, opposed slant pattern is illustrated in FIG. 2. Each dark stripe represents an area of magnetic flux transitions from one polarity to another. Thus, a servo read head following a path crossing the stripes will generate a sinusoidal analog servo signal having peaks and valleys that coincide with the stripes. The stripe patterns are said to be phase-encoded, because the phase difference between the analog servo signal generated when the servo head is over one pattern and the analog servo signal generated when the servo head is over the other pattern determines the radial distance of the head from the diameter of the disk.

In FIG. 1, for example, a portion of a combination radial/slanted servo pattern in a single servo track is shown comprising a radial portion 12 and a slanted portion 14. An exemplary on-track path followed by a servo read head is indicated by a horizontal line 16. The servo head position is determined by comparing the phase of a first analog servo signal produced by the servo read head when it is over the radial portion with the phase of a second analog servo signal produced when the servo read head is over the slant portion. In FIG. 2, the servo pattern includes a first slanted portion 20 having a plurality of slanted lines and a second slanted portion 22 having a plurality of slanted lines at right angles to the lines of the first portion 20. An exemplary on-track path followed by a servo read head is indicated by a horizontal line 24. As with the FIG. 1 pattern, servo head position information from the pattern illustrated in FIG. 2 is produced by comparing a servo signal produced from the first slant line portion 20 with a signal produced from the second, opposed slant line portion 22. An example of a servo system using such a pattern is described in U.S. Pat. No. 4,549,232 to Axmear et al., which is incorporated herein by this reference.

Typically, a servo control system for controlling the position of a servo read head includes a demodulator for servo signal sampling and for amplitude-type or phase-type detection. Such demodulators use passive and active discrete components for filtering, automatic gain control setting, and analog-to-digital conversion. Typical phase-type demodulator designs utilize zero-crossing phase detectors and produce a position error signal through a combination of phase counting, pulse counting, and averaging analog-to-digital conversion. That is, with every zero crossing of the sinusoidal analog servo signal, a pulse is generated in the demodulator. The delay between pulses generates an approximation of the phase difference between the servo signals generated by the two patterns. The manner of generating the approximation is well-known to those skilled in the art and requires no further explanation.

The various components used to implement the analog module for phase sampling and position detection can make it difficult to provide small-size electronic packages of reduced power consumption, especially for the increasingly popular small form factor (SFF) disk drives. In addition, the zero-crossing phase detection scheme provides very limited sampling points. Specifically, a zero-crossing phase detection scheme approximates a servo signal with only two sample points per cycle of the signal. This limited sampling can decrease the ability to minimize or otherwise eliminate noise from the servo signal.

Moreover, utilizing phase-encoded servo signal demodulation techniques can cause a non-linear demodulator output signal. That is, the phase difference function produced as the servo read head moves from the inside diameter of a servo track to the outside diameter of a servo track is not uniform so that the servo sensing gain obtained from a predetermined servo track radial movement at the edges of a track is not equal to the servo sensing gain obtained from radial movement at the center of a track. This complicates the design of the servo control system.

From the discussion above, it should be apparent that there is a need for a disk drive system with a servo pattern encodement and detection scheme that reduces overall circuit complexity and size and that lends itself to noise minimization techniques. The present invention fulfills this need.

SUMMARY OF THE INVENTION

In accordance with the present invention, a demodulator a servo control system receives a servo signal produced from reading a servo pattern that comprises a repeating pattern of phase-encoded magnetic flux transitions that extend continuously across the width of a servo track and includes a burst phase detector that samples the amplitude of the servo signal at high frequency intervals and produces burst sample data, from which the demodulator produces a position error signal that is a substantially linear function of the servo head position relative to the servo track width. Preferably, the phase-encoded transitions comprise a trigonometric-compensated pattern and the phase detector comprises a complementary trigonometric phase detector, such as a cosine phase detector. Because a plurality of amplitude samples is taken from each cycle of the servo signal, an increased signal-to-noise ratio can be obtained for the servo signal, thereby reducing noise and signal harmonic effects. The superior signal characteristics permit smaller and less complex demodulator elements to be used, thereby reducing the overall servo control system complexity.

In one aspect of a demodulator in accordance with the invention, the demodulator includes a burst cosine phase detector that multiplies the servo signal samples with a predetermined set of reference coefficients to produce a phase difference cosine term that indicates the servo head radial position. An associated filter is implemented by the filter coefficients and can comprise, for example, a finite impulse response digital filter, to further improve the signal strength.

Other features and advantages of the present invention should be apparent from the following description of the preferred embodiment, which illustrates, by way of example, the principals of the invention.

BRIEF DESCRIPTION OF THE DRAWINGS

FIG. 8(A) is a representation of the phase input signal produced by the system of FIG. 5 for multiple cycles of the servo pattern.

FIG. 8(B) is a representation of the phase detector output signal corresponding to the input signal of FIG. 8(A) as produced by the system of FIG. 5.

DESCRIPTION OF THE PREFERRED EMBODIMENT

Figure 1:
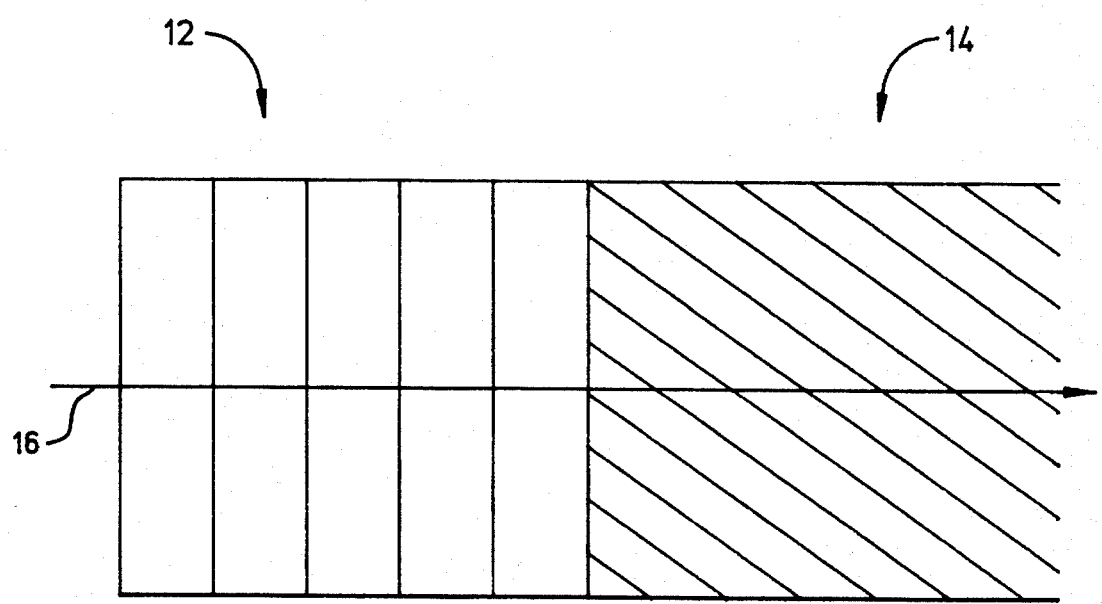
FIG. 1 is a representation of a prior art radial-slant phase pattern.
Figure 2:
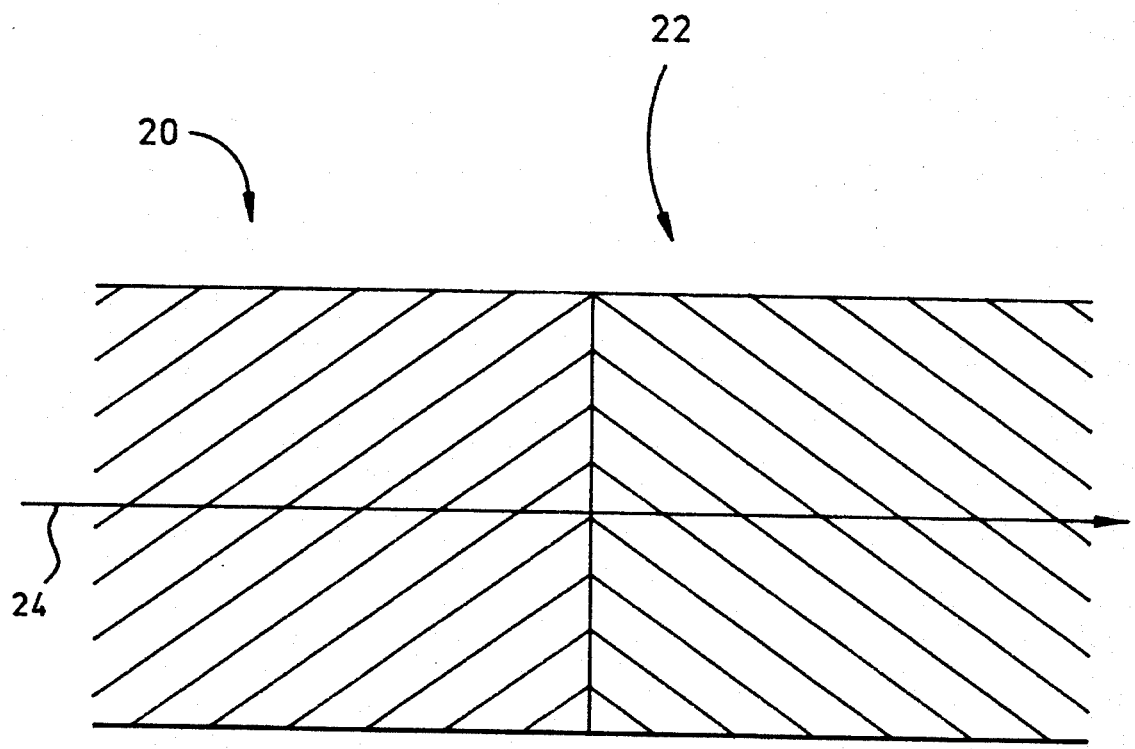
FIG. 2 is a representation of a prior art opposed slant phase pattern.
Figure 3:
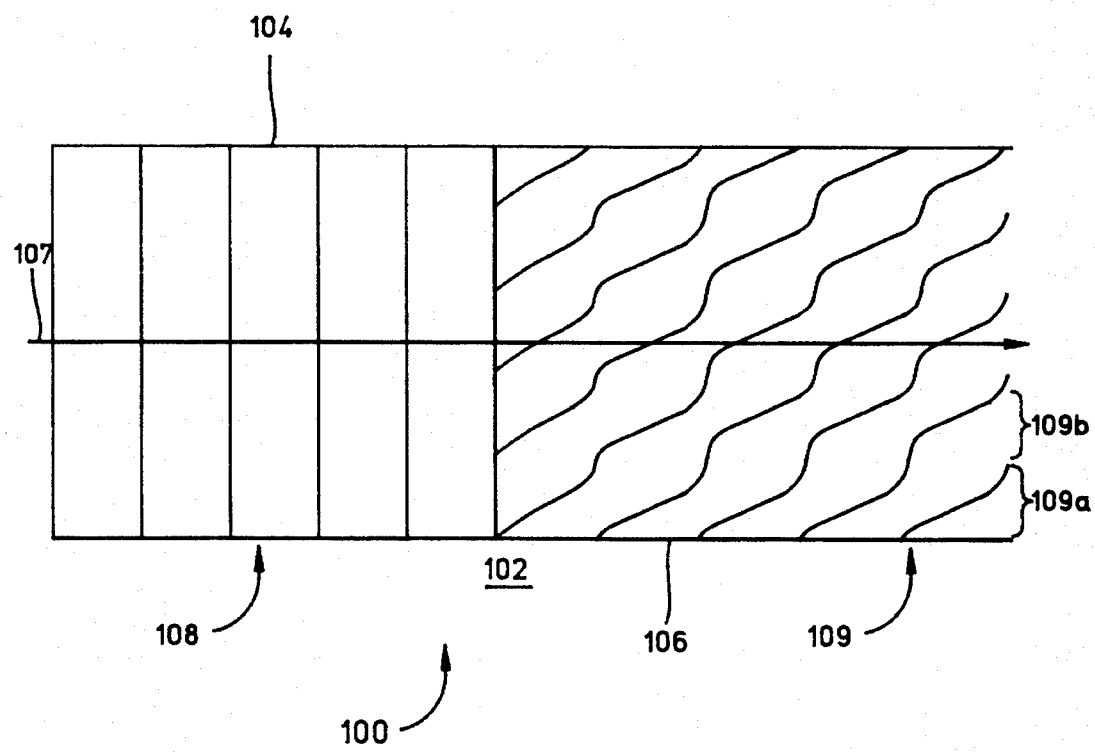
FIG. 3 is a representation of a trigonometric-compensated servo pattern recorded in accordance with the present invention.

FIG. 3 is a representation of a trigonometric-compensated, phase-encoded servo pattern 100 recorded in a servo track on a disk surface 102 in accordance with the present invention.

It should be understood that the portion of the pattern illustrated in FIG. 3 represents only a part of the servo tracks of the disk. A top edge 104 of the illustrated pattern represents a portion of the disk servo track that is closer to the outside diameter of the disk relative to a bottom edge 106 that is closer to the opposite, inside diameter of the disk. An exemplary ontrack path followed by a servo read head is indicated by a horizontal line 107 that crosses first a radial line field 108 and then an arc-cosine function stripe field 109. The amplitude of the servo signal generated from each field of the servo pattern illustrated in FIG. 3 is sampled and, in accordance with a demodulator constructed in accordance with the invention, provides a phase difference signal that is a substantially linear function of the servo read head position relative to the servo track width as the servo read head is moved from the outside diameter edge 104 to the inside diameter edge 106. The linearity of the output signal provides a substantially direct indication of the position of the servo head within a servo track, permits a simpler demodulator design, and provides opportunities for noise filtering and signal conditioning to improve position accuracy.

Those skilled in the art will appreciate that servo tracks and data tracks typically are not of equal width. Therefore, a head movement across an entire servo track width corresponds to a movement across several data tracks. For example, a movement from a first stripe or cycle 109a of the FIG. 3 trigonometric-compensated stripe field to a next field cycle 109b corresponds to a movement across approximately four data tracks. Thus, movement from the top edge 104 of the FIG. 3 pattern to the bottom edge 106 crosses five stripes or cycles of the field 109, which corresponds to approximately twenty data tracks.

Figure 4:
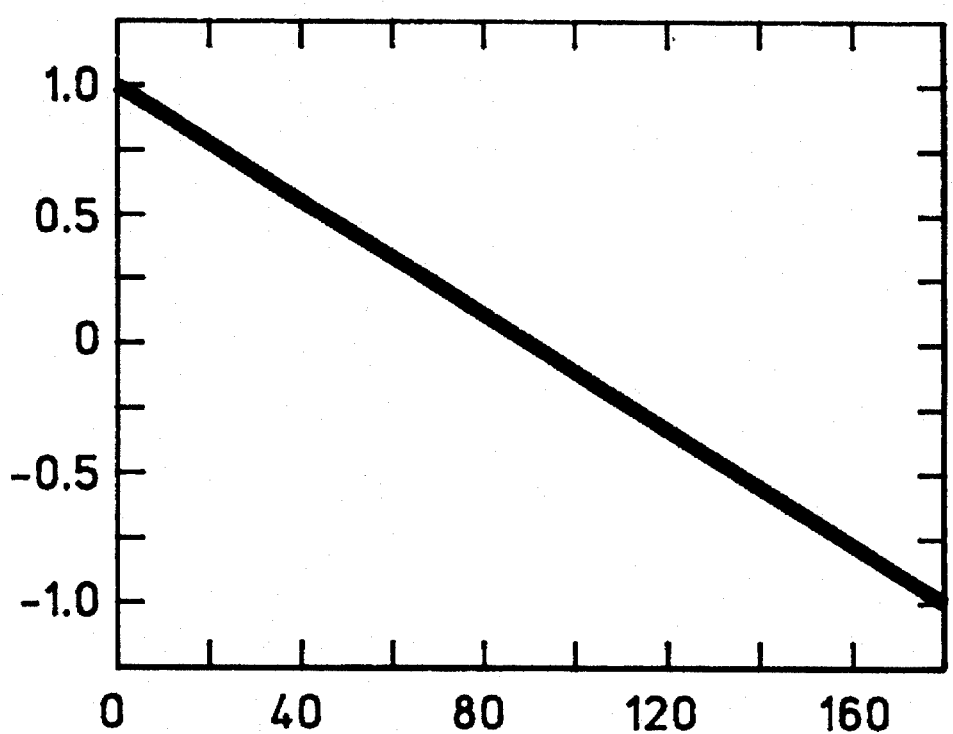
FIG. 4 is a representation of the head output signal and position error signal produced in accordance with the present invention for one cycle of the trigonometric-compensated servo pattern illustrated in FIG. 3.

FIG. 4 is a graph that illustrates one cycle of the substantially linear demodulator output signal produced in accordance with the present invention as the head is moved radially across the width of a servo track. The vertical scale of the graph indicates the output of the demodulator, which is the position error above and below a stripe of the servo pattern over one width of the track. The horizontal scale represents the encoded phase angle difference for one cycle of the repeating pattern as the servo read head travels radially across the vertical stripe field 109a illustrated in FIG. 3.

Figure 5:
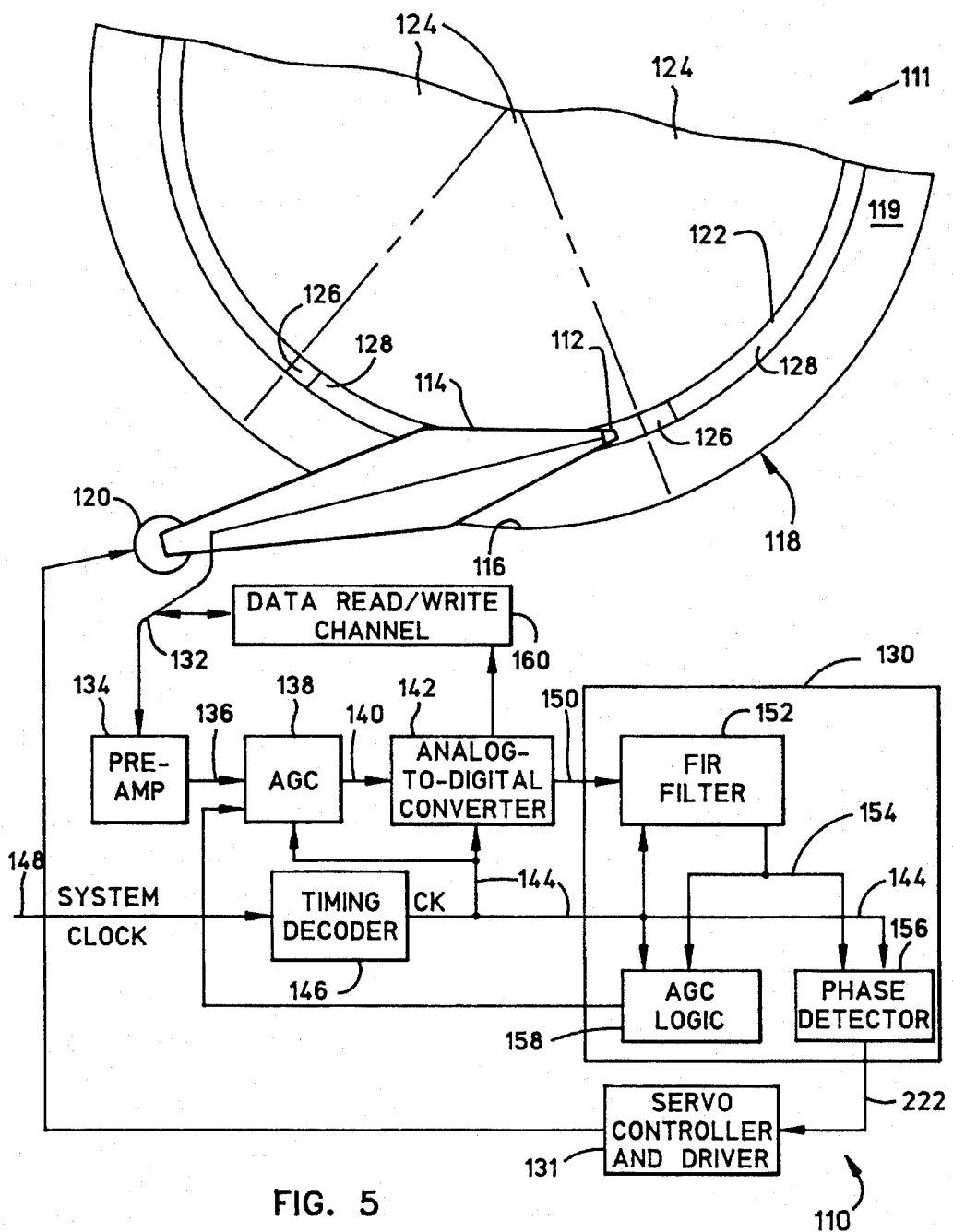
FIG. 5 is a schematic representation and block diagram of a disk drive servo control system constructed in accordance with the present invention.

FIG. 5 illustrates a position control system 110 of a sector servo data storage disk drive system 111 constructed in accordance with the present invention. It should be understood that the preferred embodiment is described with reference to the sector servo system illustrated in FIG. 5 but that the teachings of the present invention apply equally well to dedicated servo systems and other storage systems using servo-controlled heads, such as capacitive and optical sensing disk storage systems. The disk drive system of FIG. 5 includes a magnetic read/write head 112 mounted on a disk arm 114 that is suspended adjacent the top surface 116 of a storage medium comprising a disk 118 on which is deposited a magnetic recording material 119. A servo assembly 120 moves the disk arm 114 across the surface of the disk. In the preferred embodiment, the magnetic head 112 is used to read and record data on the disk 118 and also to read a servo pattern recorded on the disk. The servo pattern is recorded in tracks across the disk. In FIG. 5, a pair of circular, parallel lines designates a single servo track 122 width of the disk. In FIG. 5, only one servo track 122 is shown for clarity and simplicity of illustration. As noted above, a single servo track can include several repeated cycles of a servo pattern and can encompass multiple tracks of data.

FIG. 5 diagrammatically shows that the track is divided into sectors 124, each of which includes a servo information field 126 followed by a data field 128. The control system 110 controls movement of the disk arm 114 across the disk to move the magnetic head 112 from track to track and to maintain the head centered over a desired data track. As the magnetic head moves across the disk surface 116, it transduces the information recorded in the tracks. Thus, the magnetic head reads track servo information recorded on the disk surface at the time of disk manufacture by detecting changes in magnetic flux and generating appropriate data values and signals. The track servo information read by the magnetic head includes track address data and an analog servo position signal generated in response to the detected flux changes. The head provides the servo signal to a demodulator 130 that demodulates the servo signal. The demodulator generates a position error signal (PES) that is provided to a servo controller and driver 131 that controls the servo 120 to keep the head 112 centered on a single data track.

When the magnetic read/write head 112 reads track servo information from the track 122, the head produces an analog servo signal that is provided over a head output line 132 to a pre-amplifier 134. The pre-amplifier amplifies the servo signal and provides the amplified signal over a pre-amplifier output line 136 to an automatic gain control (AGC) circuit 138 that adjusts the gain applied to the servo signal to maintain the signal amplitude within a range that is predetermined to simplify information processing, reduce noise, and improve system linearity. The amplified signal from the AGC circuit 138 is provided over an AGC output line 140 to an analog-to-digital (A/D) converter 142 that converts the signal in accordance with a sampling clock signal CK received over a sampling clock line 144. The sampling clock signal CK is produced by a timing decoder circuit 146 that receives a system clock signal over a system clock signal line 148. The AGC circuit 138 also receives the clock signal CK and operates in accordance with it.

The digitized track servo information signal is provided from the A/D converter 142 over a converter output line 150 to a finite impulse response (FIR) filter 152 of the demodulator 130. The FIR filter performs servo signal equalization and provides equalized servo signal samples over an output line 154 to a cosine phase detector 156 and an AGC logic circuit 158 described further below. The FIR filter is adapted for the particular requirements of the servo system 111, as will be understood by those skilled in the art. For example, in the case of the illustrated sector servo design, the FIR filter includes a filter coefficient set adapted to eliminate inconsistent and unstable sector servo-type signal harmonics and distortion.

In the preferred embodiment, the amplitude of the read back servo signal from the head 112 is sampled by the FIR filter 152 eight times per respective signal cycle. Thus, eight samples per servo signal cycle generated from two lines in the radial line field 108, or pattern burst, illustrated in FIG. 3 are obtained, as are eight samples per cycle of the signal generated from two lines in the trigonometric-compensated field 109. The timing of the samples is based upon the known frequency of the radial servo stripes and of the trigonometric-compensated servo stripes illustrated in FIG. 3 and the known disk rotational speed. An FIR filter coefficient set for the eight-sample per respective signal cycle design is produced by placing zeroes at undesirable harmonic and side band frequency points. These coefficients, when applied to the digitized servo signal, provide an equalized output signal that is processed further as described below. The FIR filter 152 is designed to eliminate harmonics and distortions typically produced by inductive, and especially magneto-resistive, servo read heads. The FIR filtering greatly improves the signal quality for servo position signals and also assists in identification of sign-crossing points and phase quadrant information for demodulation logic control.

Figure 6:
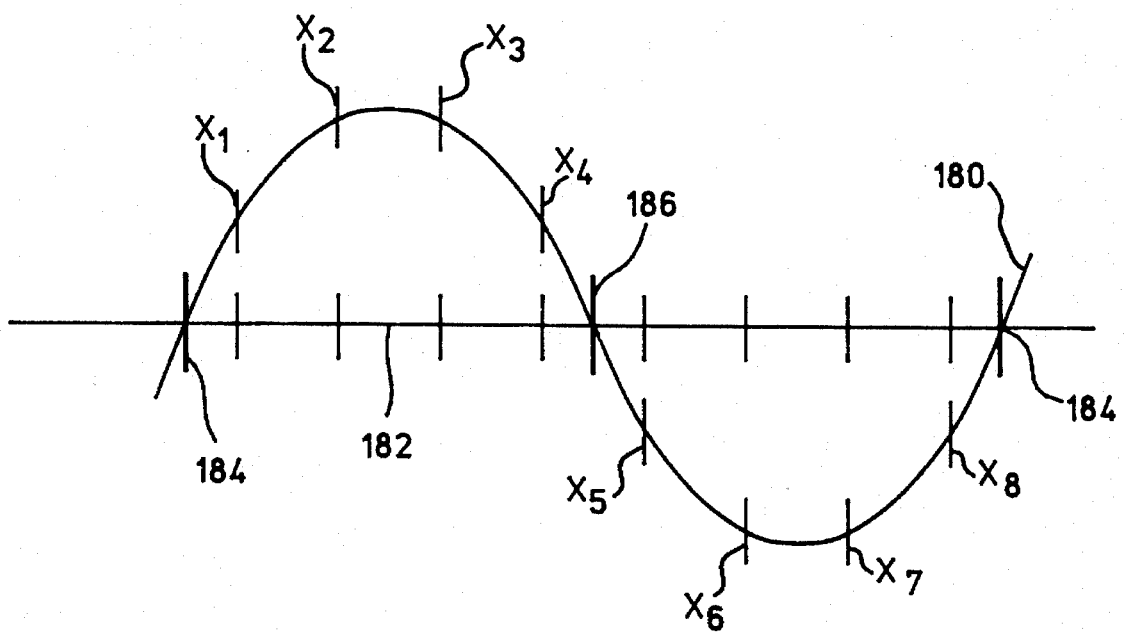
FIG. 6 is a representation of the analog servo signal samples taken by the servo control system illustrated in FIG. 5.

More particularly, the equalized servo signal provided to the FIR filter 152 can be represented as a series of m digital sample values $x_1, x_2, \ldots, x_m$, obtained per respective servo signal cycle. FIG. 6 is a representation of the servo signal 180 with the eight sample amplitudes represented by a series of vertical ticks along the signal waveform, which correspond to indicated $x_1, x_2, x_3, \ldots, x_8$ sample values. Each peak of the servo signal represents a stripe of the respective pattern. The illustrated signal is centered about an established line 182 for purposes of illustration. The FIR filter is implemented as an asymmetric coefficient filter and, in particular, is referred to as a fixed tap logic equalizer filter having filter coefficients denoted by the set $(H_1 H_2 \ldots H_{m-1})$ for m samples-per-cycle sampling. That is, each sample value except the first one is used by a corresponding filter simultaneously for multiplication and accumulation. It should be noted that in a conventional system employing zero-crossing detectors to derive the servo signal, only two sample points 184, 186 per cycle are used to derive phase information, in contrast to the illustrated system, which approximates the complete signal from eight amplitude samples.

Referring again to FIG. 5, the magnetic head 112 includes a data channel read/write element as well as a servo read element. Therefore, the A/D converter 142 provides its output to a data read/write channel 160 as well as to the servo signal demodulator 130. The data channel preferably includes a data channel FIR filter and a data detector circuit that receives the A/D converter output for processing before the output is sent to data processing elements of the host computer system. Those skilled in the art will recognize that, if desired, the data channel FIR filter and the servo demodulator FIR filter 152 could be combined in a single FIR filter having a first coefficient set for the data channel application and a second coefficient set for the servo demodulator function. In this way, when the head 112 is over a servo information field 126, the coefficient set for the FIR filter is switched to the coefficient set adapted for the servo demodulator function and when the head is over a data field 128, the FIR coefficient set is switched to the coefficient set adapted for the data channel application.

In the preferred embodiment, the eight samples $x_1, x_2, \ldots, x_8$ are obtained per burst cycle of the servo information signal as illustrated in FIG. 5 and are processed to produce a sequence of filtered signal sample data sn for each sample value defined by:

$$s_n = \Sigma(H_i(x_{(n-i)}))$$

for the sample values $x_1, x_2, \ldots, x_n$, where $i=1, 2, \ldots, 7$ and the filter coefficients $(H_1 H_2 \ldots H_7)$ are defined by:

$$H_i = (-1.0\ -1.414\ -1.0\ 0\ 1.0\ 1.414\ 1.0).$$

It should be apparent that the $H_i$ filter coefficients are asymmetrically distributed about a center tap coefficient of zero, because the coefficients are negative to one "side" of the center tap and positive to the other. These $H_i$ coefficients, when applied to the digitized servo signal, provide a filtered output signal that is processed further as described below. This type of filter and these coefficients are designed to use for the servo pattern transducing function. Those skilled in the art also will recognize that other types of filters and sets of filter coefficients can be used, depending on the application. For example, a symmetric-type filter could be used in place of the asymmetric filter described above.

Figure 7:
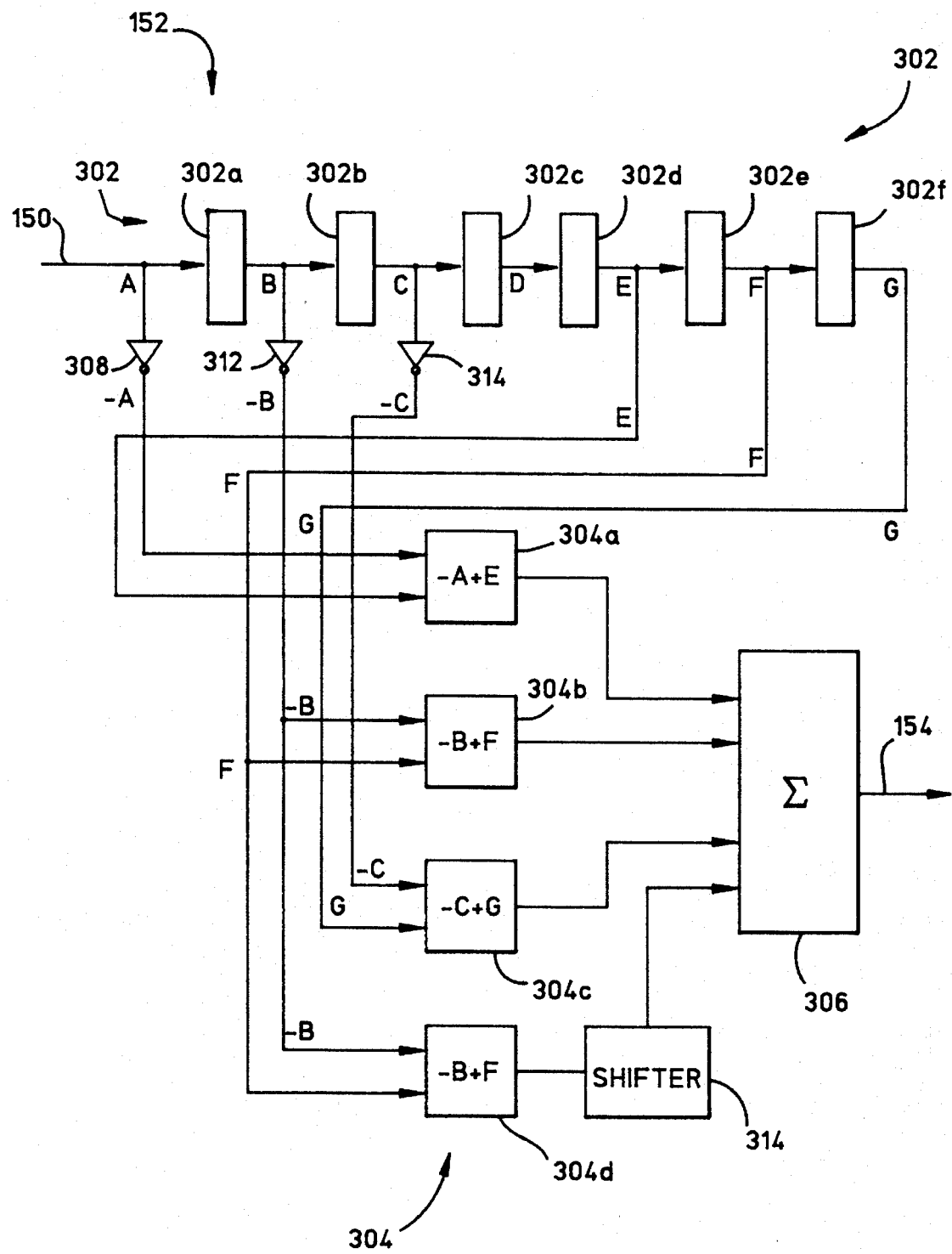
FIG. 7 is a block diagram of the FIR filter illustrated in FIG. 5.

FIG. 7 illustrates an adder-only implementation of the FIR filter 152 in the preferred embodiment. The FIR filter receives the digitized servo signal over the signal line 150, where the signal is provided to a series of delay registers 302. Each of the registers provides a one-clock-cycle delay relative to the CK signal of the clock signal line 144 (see FIG. 5). The variously delayed signal samples from the registers are provided to a group of adders 304 whose output signals are added in a summing circuit 306 to provide the FIR output signal over the FIR output line 154.

In particular, the first, undelayed sample value $x_8$ (see FIG. 5) is indicated as "A" in FIG. 7 and is inverted by an inverter 308 before being provided to a first input port of a first adder 304a. The second input port of the first adder is provided with the output of the fourth delay register 302d, which corresponds to the sample value $x_4$ and is indicated as "E". In the first adder, the sample values are multiplied by the appropriate coefficients and added. Thus, the output of the first adder 304a is the sum of the peak-to-peak filtered amplitudes of the first and fourth signal samples illustrated in FIG. 6. The output of the first delay register 302a corresponds to the sample value $x_7$ and is indicated as "B". This value is inverted by an inverter 312 before being provided to the first input port of another adder 304b. The second input port of the second adder 304b is provided with the output sample value $x_3$, indicated as "F", of the fifth delay register 302e. Thus, the output of the second adder is the sum of the peak-to-peak filtered amplitudes of the seventh and third signal samples. Similarly, the output sample value $x_6$ indicated as "C" of the second delay register 302b is inverted by an inverter 314 and provided along with the $x_2$ output of the last delay register 302f to the third adder 304c, which produces the sum of the peak-to-peak filtered amplitudes of the sixth ("C") and second ("G") samples. Finally, the output of a fourth adder 304d represents the sum of the peak-to-peak filtered amplitudes of the seventh and third signal samples, -B+F, and is right-shifted one bit in a shifter 314 to provide division by two and then is provided to the summing circuit 306. Thus, the sum (-B+F)/2 is produced from the fourth adder. The output of the summing circuit 306 comprises the output of the FIR filter 152.

The output from the FIR filter 152 is provided to the AGC logic circuit 158. This circuit processes the filtered servo signal samples and produces an approximated signal amplitude output y according to the equation:

$$y=|x_2+x_3|+0.5|x_2-x_3|+|x_6+x_7|+0.5|x_6-x_7|$$

where the $x_i$ values correspond to the signal samples illustrated in FIG. 6 after filtering and sign detection. In this way, the AGC logic circuit 158 and gain adjustment AGC block 138 provide gain control for the signal samples to be processed by the FIR filter 152 and phase detector 156. An alternative implementation of the AGC logic circuit utilizes only the first and second signal samples $x_2$ and $x_3$ from the first half cycle of the servo signal and therefore does not include the $x_6$ and $x_7$ terms in the y expression above.

In the preferred servo controller embodiment illustrated in FIG. 5, the output from the FIR filter 152 also is provided to the cosine phase detector 156, which determines the phase difference between the servo signal generated from the radial field 108 and the signal generated from the trigonometric-compensated field 109 as described above in connection with FIG. 3. The phase detector produces the phase difference by multiplying the filtered signal samples with a reference sine series comprising an approximated digital reference signal. More particularly, the cosine phase detector 156 utilizes the following trigonometric identity:

$$2 \sin (t)^* \sin (t+\theta)=\cos (\theta)-\cos (2t+\theta),$$

where the digitized output servo signal represented by $\sin(t+\theta)$ comprises a $\sin(t)$ reference function with a phase term of $\theta$. The multiplication of the FIR filtered signal sample values $x_1, x_2, \ldots, x_8$ obtained per servo signal cycle by the $2\sin(t)$ term produce a sequence of multiplied sample values $Z_n$ defined by:

$$Z_n=(R_n)(x_n)$$

for each filtered signal cycle with samples values $x_1, x_2, \ldots, x_n$ from each field of the servo pattern and the reference coefficients are defined by the set $(R_1 R_2 \ldots R_8)$ comprising:

$$R=(1.5\ 2.0\ 1.5\ 0\ -1.5\ -2.0\ -1.5\ 0)$$

for the filtered samples of the servo signal from the radial field and by the set $(R_1, R_2 \ldots R_8)$ comprising:

$$R=(-1.5\ -2.0\ -1.5\ 0\ 1.5\ 2.0\ 1.5\ 0)$$

for the filtered samples of the servo signal from the trigonometric-compensated field. After multiplication of the filtered signal samples with the reference coefficients as the signal term $2\sin(t)$, representing the left-hand side of the trigonometric identity, the cosine phase detector 156 filters out the $\cos(2t+\theta)$ term of the right side by the accumulation with $Z=\Sigma_n$, leaving only the accumulated cosine term. Thus, the accumulated phase angle $\theta$ to the phase detector is obtained as a constant when the servo head 112 moves across the radial pattern field 108 (FIG. 3) radially. When the servo head 112 moves across arc-cosine compensated pattern field 109, a linear phase error function $\cos(\theta)$ can be obtained where $$\cos(\theta)=\cos(\cos^{-1}(p))=p$$

for a value p specified by the distance across a section of the width of a servo track field 109. For example, FIG. 8 illustrates the servo pattern (FIG. 8A) and the corresponding output signal (FIG. 8B) of the cosine phase detector, respectively, for a servo head travelling across servo track fields radially defined by the horizontal (zero) axis. That is, the detector output signal of FIG. 8B illustrates the linear output obtained as the servo head crosses several "stripes" or cycles of the trigonometric-compensated fields of FIG. 3 from the top edge 104 toward the bottom edge 106.

Figure 9:
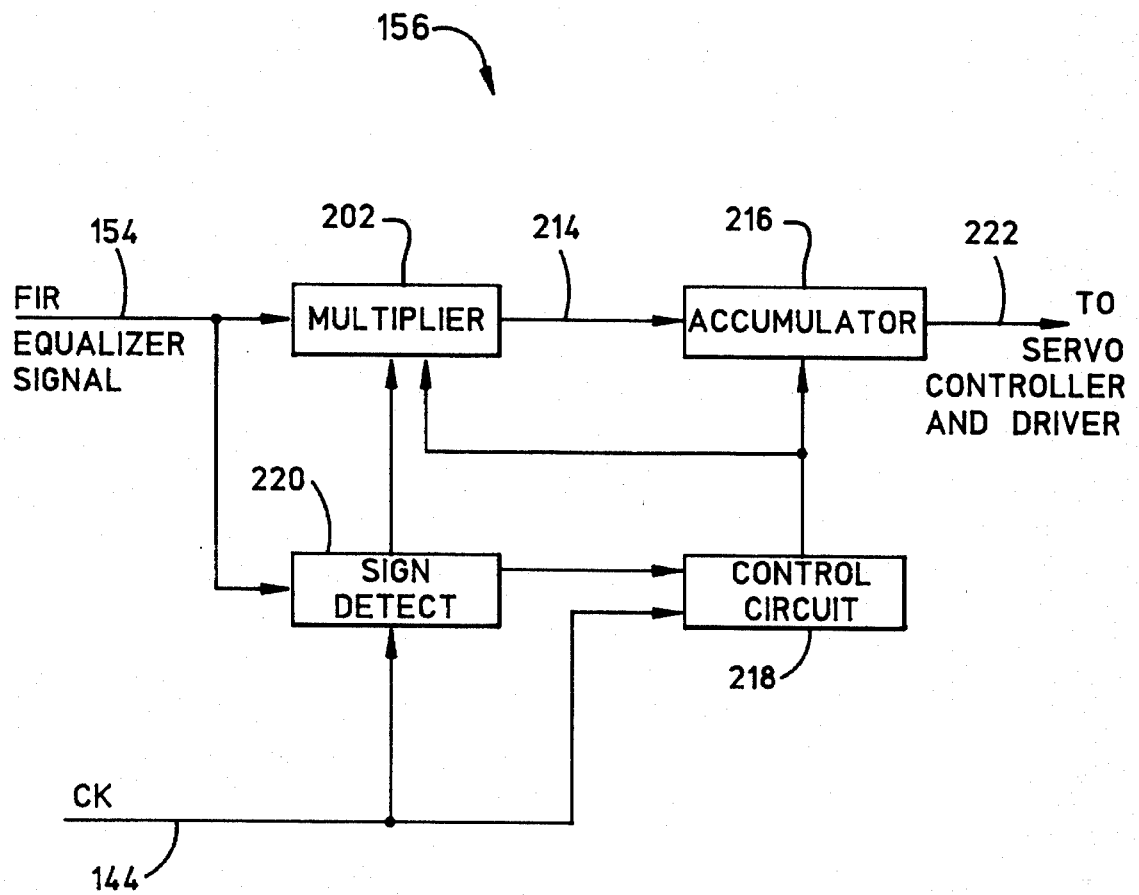
FIG. 9 is a block diagram of the burst cosine phase detector illustrated in FIG. 5.

FIG. 9 illustrates the elements of the burst cosine phase detector 156 of the preferred embodiment in greater detail. As illustrated, the detector includes a multiplexing digital multiplier 202 that performs the multiplication function described above. That is, the multiplier carries out the multiplication of the eight filtered samples per cycle of the servo signal by the reference coefficient sets described above.

Figure 10:
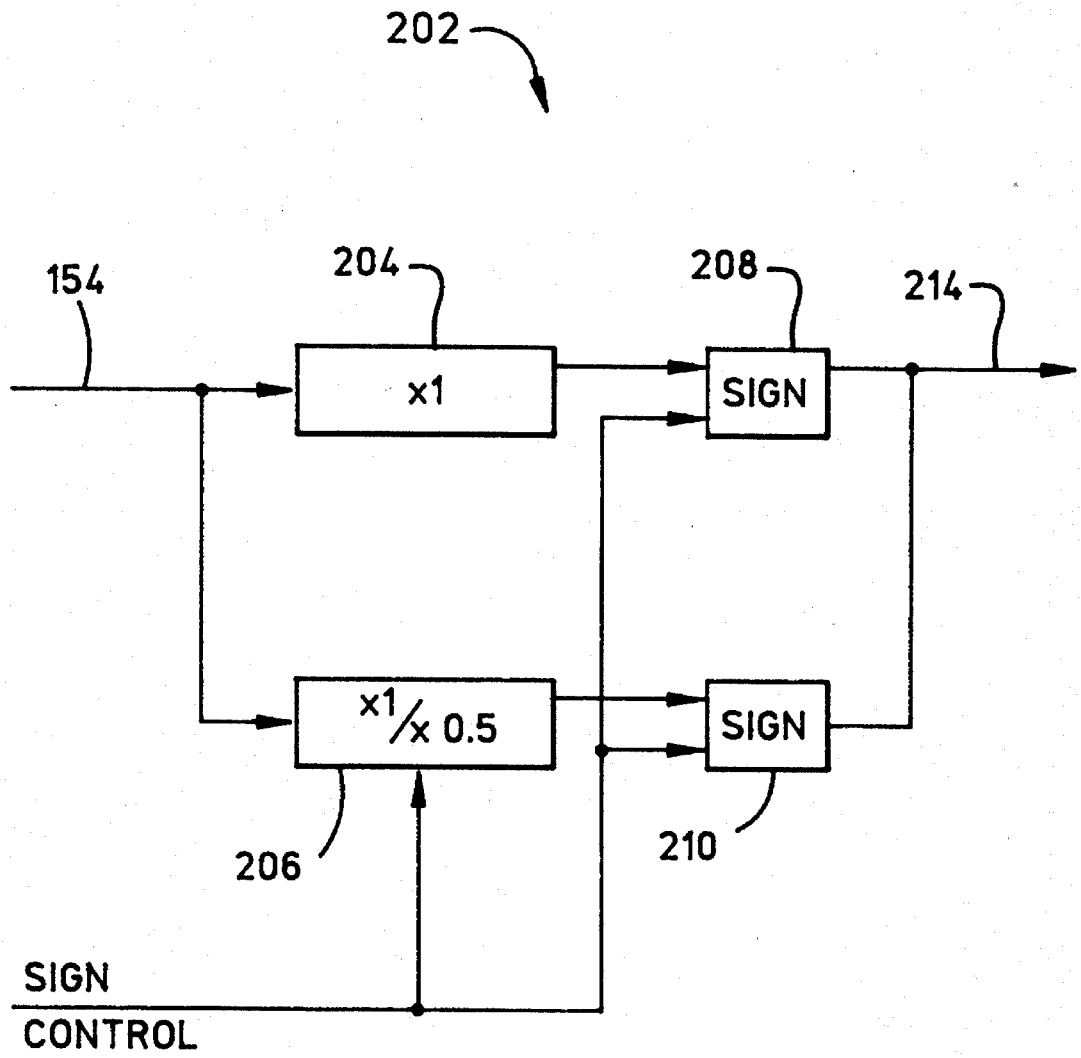
FIG. 10 is a block diagram of the multiplier illustrated in FIG. 9.

The structure of the multiplier 202 is shown in greater detail in FIG. 10, which shows that the multiplication is performed by adding a filtered signal sample latched in two registers 204, 206 and output to sign-conversion logic circuits 208, 210, respectively, for each of the eight samples per respective signal cycle. For example, multiplication by the reference coefficient 1.5 is accomplished by latching an input data signal sample to the upper register 204 and latching a one-bit right-shifted data sample in the lower register 206. The sign-conversion logic circuits convert the sign of the respective terms for the -1.5 and -2.0 multiplication operation, as needed and in accordance with a sign control signal received from a sign detector circuit 220 (FIG. 9). Thus, for processing a second burst field, the sign of the reference sequence of multiplication is changed such that the multiplication coefficients correspond to the sets as described above. This sign change accomplishes the subtraction of burst samples for the respective cycles of the servo signal from two pattern fields.

Referring again to FIG. 9, which is the phase detector 156 block diagram, after the multiplier 202 produces the signal samples, the output is provided over the multiplier output line 214 to an accumulator 216. The accumulator is controlled by a phase detector control circuit 218, which also controls the multiplier 202. The accumulation of the burst samples for the two burst fields from the multiplier will then produce a servo position error data signal on an output line 222 for representing servo head radial position for servo control. The sign detector 220 receives the FIR equalizer signal over the FIR signal line 154 and receives the clock signal CK over the clock line 144. The sign detector produces the sign control signal provided to the multiplier 202 (FIG. 10) and the control circuit 218 according to the samples received from the FIR filter 152, as indicated by the clock signal CK. The output from the accumulator 216 is provided over the output signal line 222 to the servo controller and driver 131, which is illustrated in FIG. 5. The servo controller driver generates control signals provided to the servo 120 to move the disk arm 114 and thereby position the magnetic head 112 to keep the head centered on a data track within the servo track field 122.

Figure 11:
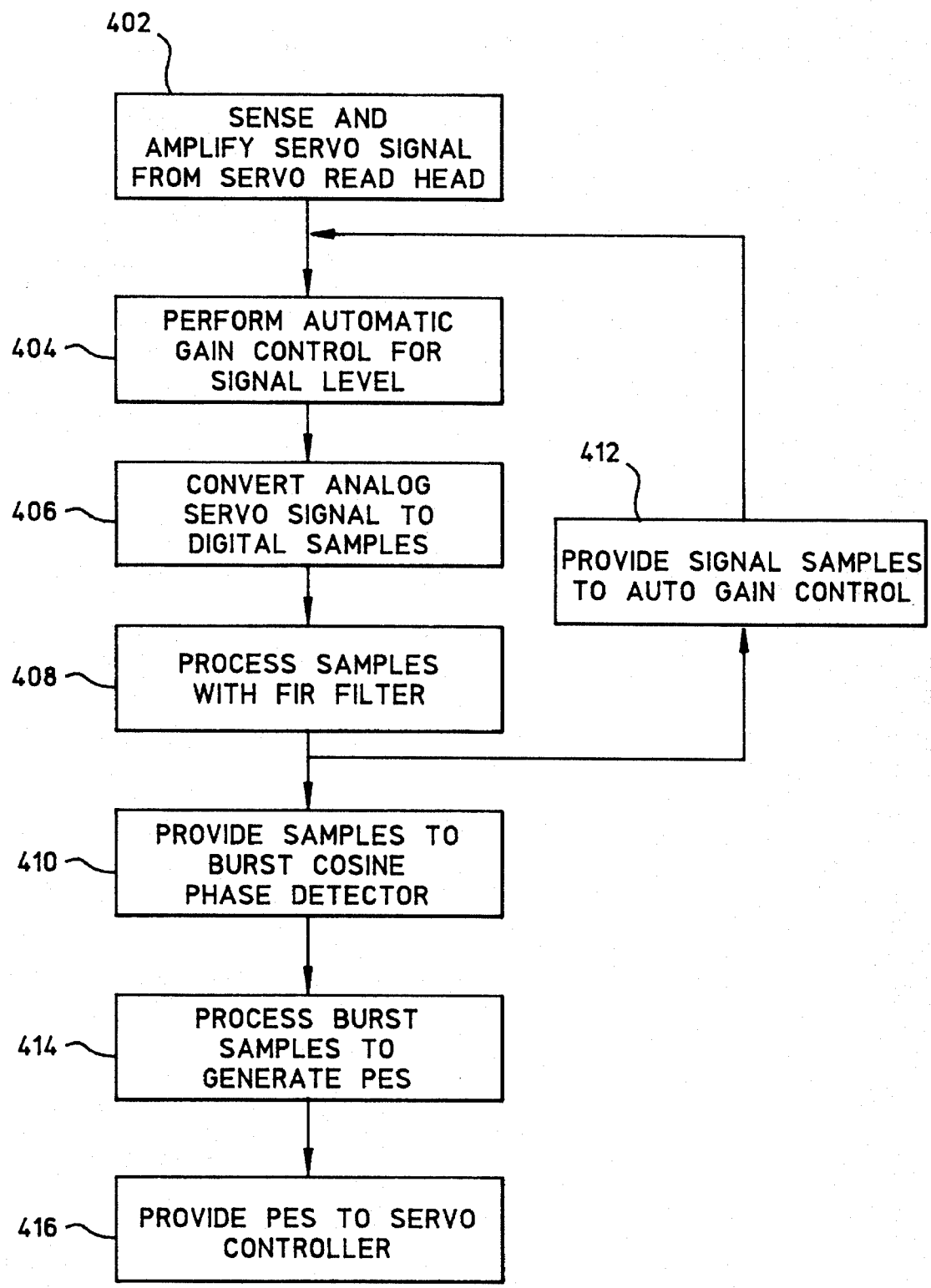
FIG. 11 is a flow diagram of the processing steps performed by the system illustrated in FIG. 5.

FIG. 11 is a flow diagram that illustrates the processing of the servo control system illustrated in FIG. 5. First, in the flow diagram box numbered 402, the system senses and amplifies the servo signal from the magnetic head. Next, at the box numbered 404, the automatic gain control processing is applied to produce the desired signal level. Next, at the flow diagram box numbered 406, the flow diagram illustrates that the output from the automatic gain control is provided to an analog-to-digital converter circuit. Next, at the box numbered 408, the digital samples are processed by the FIR filter. Afterwards at box 410 the samples are provided to the phase detector and at box 412 are provided to the AGC logic circuit. In the processing of box 410, the appropriate sine and cosine multiplication described above in connection with FIG. 9 takes place. In the processing of box 412, the appropriate multiplication and addition described above in connection with the AGC logic circuit of FIG. 5 take place. At the next flow diagram box, numbered 414, the burst sample accumulation is accomplished, producing the position error signal (PES). Finally, at the flow diagram box numbered 416, the servo controller/driver receives the PES and generates the appropriate head correction signal that is provided to the head servo.

Those skilled in the art will readily appreciate that the trigonometric-compensated, phase-encoded servo pattern illustrated in FIG. 3 can be written with a variety of systems. A preferred embodiment of the processing followed by an exemplary servo pattern writing system is illustrated in FIG. 12.

Figure 12:
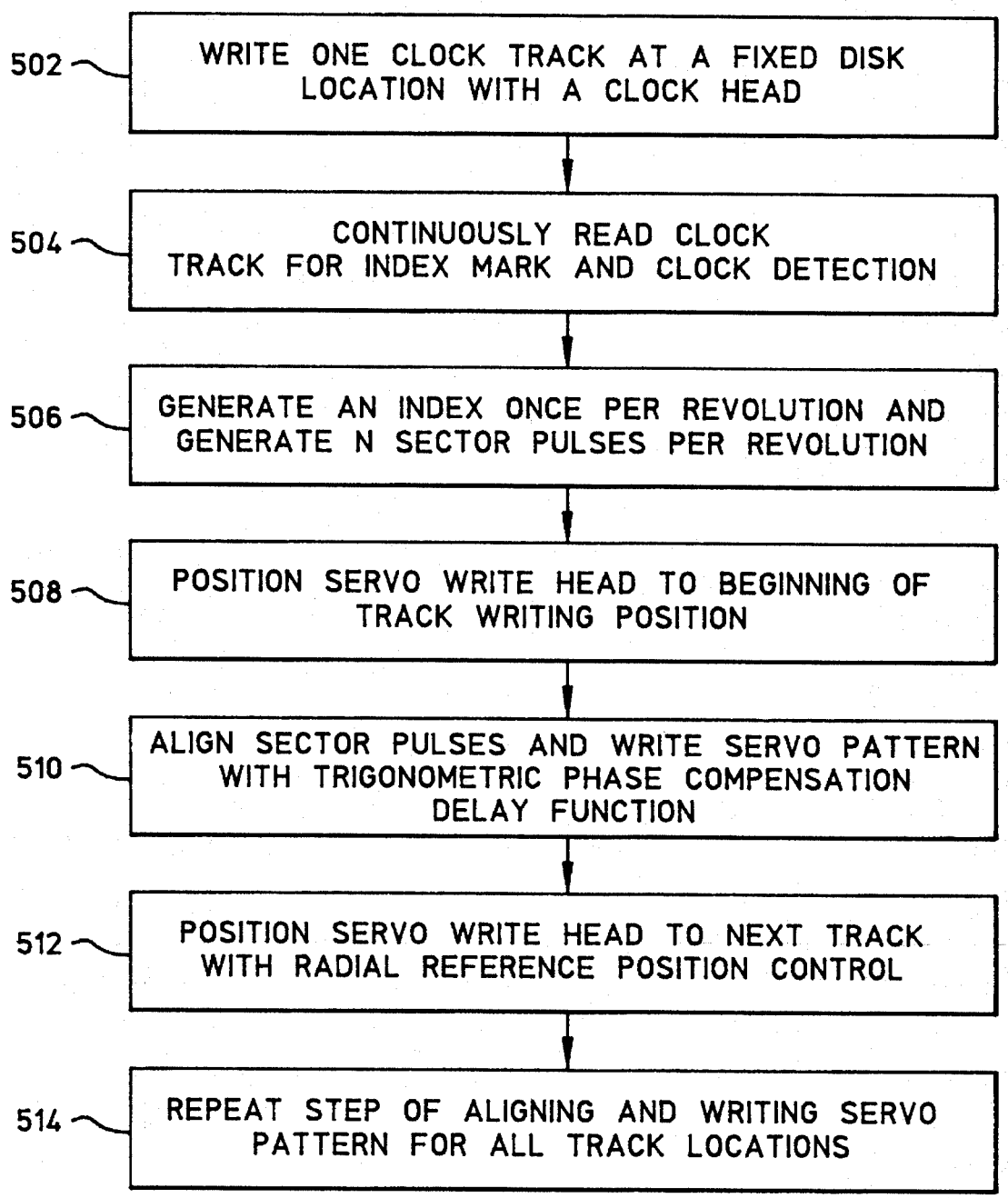
FIG. 12 is a flow diagram of the processing steps performed in producing the pattern illustrated in FIG. 3.

In FIG. 12, the servo pattern writing process begins at the flow diagram box numbered 502 where a single track comprising a clock signal is recorded at a fixed disk diameter location using a magnetic write head. At the next flow diagram box numbered 504, the write system continuously reads back the clock track and generates an index mark and clock pulses. Next, at the flow diagram box numbered 506, the system generates one index mark per revolution of the disk and generates N sector pulses (one pulse for each disk sector) per revolution of the disk, based on the clock readback signal.

Next, at the flow diagram box numbered 508, the servo write head is moved to the beginning of a track writing position. The position could comprise, for example, the middle of a servo field, immediately following a track identification sub-field or the like. At the flow diagram box numbered 510, the sector pulses are calibrated, or aligned, and the servo pattern is written with a delay produced by a nonlinear phase compensation function. Those skilled in the art will understand the details of such a function, in view of the description above relating to the cosine phase detector and FIGS. 3–8, without further explanation. Finally, at the flow diagram box numbered 512, the head is pushed to the next track with a radial reference head position control. Next, at the FIG. 12 flow diagram box numbered 514, the prior step of flow diagram box 510 is repeated for a track writing operation and continues to the last track location.

Figure 13:
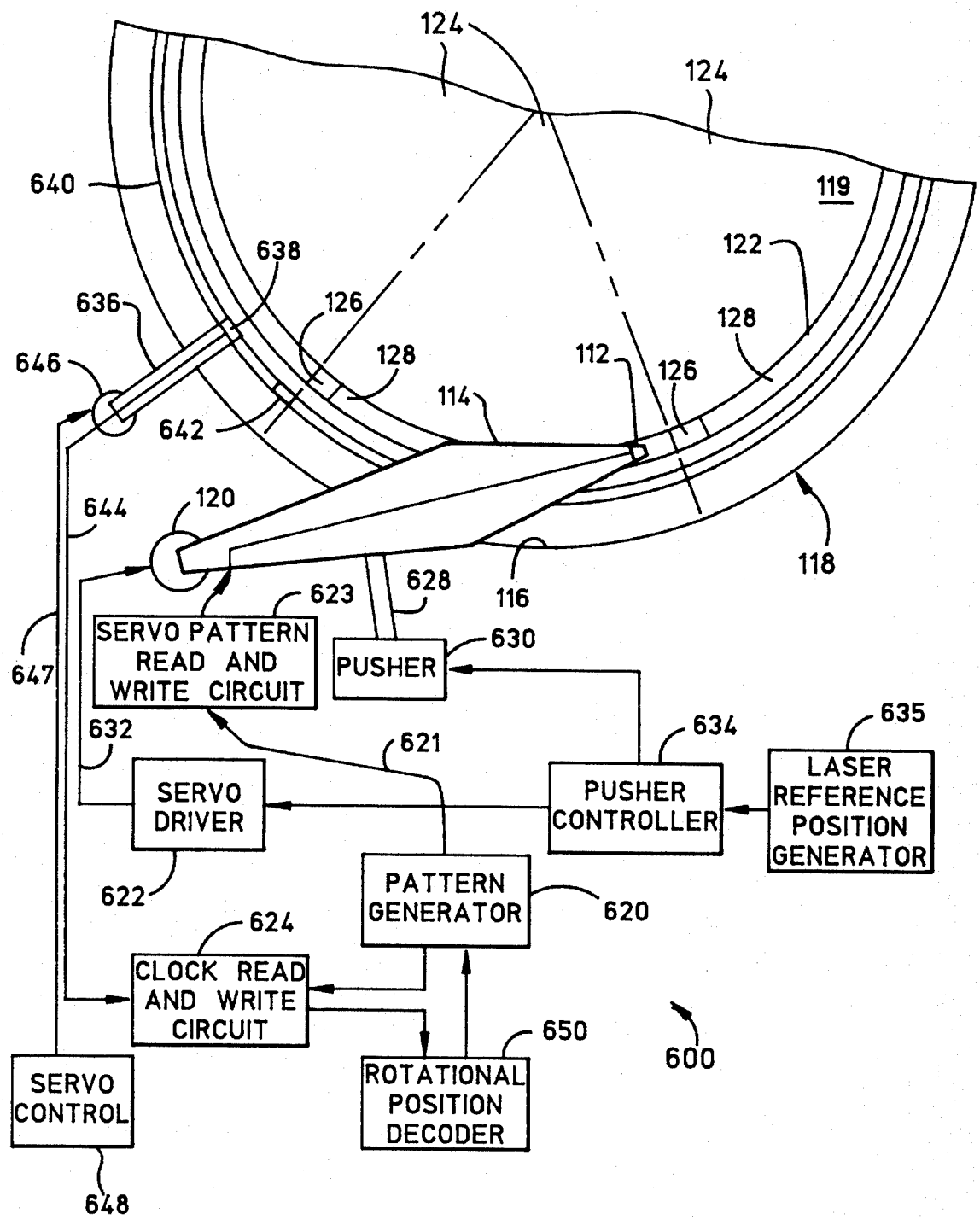
FIG. 13 is a schematic representation and block diagram of a disk drive servo pattern writing system constructed in accordance with the present invention for recording the servo pattern illustrated in FIG. 3.

FIG. 13 shows a preferred embodiment of a disk servo pattern recording system 600 constructed in accordance with the present invention. The system 600 is for recording a servo pattern in accordance with a sector servo system, but it should be understood that the teachings of the present invention apply equally well to dedicated servo systems and other storage systems using servo-controlled heads, such as capacitive and magneto-optical disk storage systems. The pattern recording system of FIG. 13 includes a magnetic servo write head 112 mounted on a servo pattern ann 114 that is suspended adjacent the top surface 116 of a storage medium comprising a disk 118 on which is deposited a magnetic recording material 119. The servo arm 114 is moved across the disk by the combination of an arm servo 120 and a pusher 628.

As noted above in connection with FIG. 5, the servo pattern is recorded in tracks across the disk. In FIG. 13, a pair of circular, parallel lines designates a single servo track 122 width of the disk, which is divided into sectors 124 that are represented by radial lines. In FIG. 13, only one servo track 122 is shown for clarity and simplicity of illustration. The single servo track illustrated can include several repeated cycles of a servo pattern and can encompass multiple tracks of data. As noted above, each sector 124 includes a servo information field 126 followed by a data field 128. Data can be recorded and read from the data field after the servo pattern has been recorded using, for example, the system illustrated in FIG. 5.

The servo pattern recording system 600 operates under the control of a pattern generator 620, which generates servo pattern signals that cause magnetic transitions comprising the servo pattern illustrated in FIG. 3 to be recorded on the disk 118 and also generates timing clock signals that are recorded and read back during the servo writing process described above in connection with FIG. 12. The pattern generator produces a pattern signal that is provided over a pattern generator output line 621 to a servo pattern read/write circuit 623 and then to the servo write head 112. The pattern signal causes the write head 112 to be intermittently energized, which thereby generates the magnetic transitions that are recorded into the servo track 122 and comprise the servo pattern illustrated in FIG. 3. The timing clock signals are provided to a clock read/write circuit 624, as described further below. A pusher controller 634 determines the radial position of the servo pattern arm 114 through a position signal generated by a laser reference position generator 635 and controls the rotary position of the arm as described further below, and uses these determinations to properly record the servo pattern.

The servo arm 114 illustrated in FIG. 13 is moved by the pusher arm 628, which is controlled by a pusher assembly 630. A control reference is provided to the pusher controller 634 by the laser reference position generator 635 to indicate the arm position with great accuracy. That is, the pusher arm 628 position is determined by a laser assembly and is calibrated so as to determine the corresponding servo write head 112 position. The servo arm 114 is moved across the disk 118 by the pusher arm with a combined force produced by the arm servo in response to a signal from the servo driver 622 received over a VCM signal line 632. The laser reference position generator 635 generates a signal that indicates the radial position of the servo write head 112 over the disk 118 and provides the position reference signal to the pusher controller 634. The pusher controller determines the correct disk position for the pusher arm based on the position reference and generates appropriate pusher control signals, which it provides to the pusher assembly 630 for moving the pusher arm 628.

As noted above in connection with the flow diagram of FIG. 12, a time track is written onto the surface of the disk 118 as part of the servo pattern writing operation. FIG. 13 shows that the servo pattern recording system 600 includes a separate servo clock arm 636 having a clock read/write head 638 that records a clock timing signal into a clock track 640 (represented in FIG. 13 by two parallel lines) of the disk. The system also records an index mark 642 at a single location of the clock track, and uses the index mark in recording the servo pattern as described in connection with FIG. 12. The index mark is placed at a predetermined location with respect to the servo sectors 124 and to the servo fields 126 of the disk 118. The clock timing signal and the index mark are recorded in accordance with a clock timing signal and index signal generated by the servo pattern generator 620, which provides these signals to the clock head 638 from an output signal line 644 of the associated clock read and write circuit 624.

A clock head servo 646 moves the servo clock arm 636 during the recording of the clock track in response to signals received over a clock servo line 647 from a clock servo controller 648. During the initial recording of the timing track, the clock and index timing signals are received from the pattern generator 620. The clock head 638 transduces the timing signal recorded in the clock track 640 and generates a clock readback signal that is processed by the clock read and write circuit 624 over the output signal line 644. The index mark and clock signal are generated by a rotational position decoder 650 which provides the rotary position signals and that generates a rotary position count and provides it to the pattern generator 620. The position count signal is a count of the clock signal read back from the clock track 640 and is used by the pattern generator to generate appropriate signals and delay during servo track writing. The system 600 is operated as described above in connection with the flow diagram of FIG. 12 and thereby produces the servo pattern illustrated in FIG. 3.

Thus, a position error sensing detector system in accordance with the present invention includes a demodulator that receives a servo signal produced from reading a servo pattern that comprises a repeating sequence of trigonometric-compensated, phase-encoded magnetic flux transitions and includes a burst cosine phase detector that samples the amplitude of the servo signal at regular intervals and produces burst sample data, from which the demodulator produces a position error signal that is a substantially linear function of the servo head position relative to the servo track width. The linear position error signal permits an increased signal-to-noise ratio, permits smaller and less complex demodulator elements to be used, and thereby reduces the overall servo control system complexity.

The present invention has been described above in terms of a presently preferred embodiment so that an understanding of the present invention can be conveyed. There are, however, many configurations for servo control systems not specifically described herein but with which the present invention is applicable. The present invention should therefore not be seen as limited to the particular embodiment described herein, but rather, it should be understood that the present invention has wide applicability with respect to servo control systems generally. All modifications, variations, or equivalent arrangements that are within the scope of the attached claims should therefore be considered to be within the scope of the invention.

I claim:

1. A signal demodulator for receiving a read head servo signal generated by a read head located adjacent a surface of a moving magnetic storage medium and demodulating the servo signal to determine the position of the read head relative to a servo track of the storage medium, the demodulator including:

a filter that receives a read head servo signal produced from a servo pattern comprising a repeating sequence of phase-encoded pattern transitions extending continuously across the width of the servo track and produces filtered servo signal data samples indicative of the servo signal amplitude; and a burst phase detector that receives the filtered servo signal and produces a position error signal that is a substantially linear function of the read head position relative to the servo track width;

wherein the servo pattern transitions define a trigonometric-compensated pattern across the servo track and the burst phase detector multiplies the filtered servo signal samples with a predetermined set of reference coefficients that provide a trigonometric compensation to the data.

2. A signal demodulator as defined in claim 1, wherein the filter includes a set of coefficients asymmetrically distributed relative to a filter center tap so as to provide harmonic and noise reduction of the read head servo input signal to the demodulator.

3. A signal demodulator as defined in claim 1, wherein the servo pattern comprises a radial line pattern field and an adjacent trigonometric-compensated stripe pattern field and wherein the position error signal comprises a phase difference signal determined from the difference of the read head signal generated from the radial line pattern and the read head signal generated from the trigonometric-compensated stripe pattern.

4. A signal demodulator as defined in claim 3, wherein the burst phase detector includes a multiplier that multiplies the filtered servo signal samples with a predetermined set of reference coefficients and an accumulator that accumulates corresponding data samples generated from each respective servo pattern field.

5. A servo control system for positioning a magnetic head adjacent a surface of a moving magnetic storage medium for reading a servo pattern recorded in at least one track on the storage medium surface, the system comprising:

a head assembly having at least one servo read head for reading the servo pattern on the storage medium in a transducing direction and generating a read head servo signal;

a filter that receives a read head servo signal produced from a servo pattern comprising a repeating sequence of phase-encoded magnetic transitions extending continuously across the width of the servo track width and defining a radial line pattern field and an adjacent trigonometric-compensated stripe pattern field, the filter producing filtered servo signal data samples indicative of the read head servo signal amplitude;

a burst cosine phase detector that receives the filtered servo signal and produces a trigonometric-compensated position error signal that is a substantially linear function of the read head position relative to the servo track width;

an automatic gain control circuit that approximates the servo signal amplitude from the data samples and provides signal level control for demodulation by the filter and phase detector;

a servo assembly that is activated to position the head assembly relative to the storage medium; and a servo controller that controls the servo assembly in accordance with the position signal to maintain the magnetic head centered relative to a data within the servo track width.

6. A servo control system as defined in claim 5, wherein the burst cosine phase detector includes a multiplier that multiplies the filtered servo signal samples with a predetermined set of reference coefficients and an accumulator that accumulates corresponding data samples generated from each respective servo pattern field.

7. A servo control system as defined in claim 5, wherein the servo signal data samples produced by the filter define a signal having a constant phase error function as the servo head moves across the trigonometric-compensated stripe pattern field.

8. A disk head position control system for use in a disk drive having a magnetic storage media disk with a magnetic recording material deposited with respect to a surface of the disk, on which is recorded a plurality of servo tracks, the disk further having a magnetic head for transducing the servo pattern and generating a servo signal, the position control system comprising:
- a burst cosine phase detector that samples the amplitude of the servo signal and determines the relative phase of the signal such that it produces a position error signal;
- a disk head servo that moves the disk magnetic head relative to the surface of the magnetic storage media disk in response to the position error signal; and
- a servo pattern, recorded in the servo tracks, comprising a repeating sequence of trigonometric-compensated, phase-encoded magnetic flux transitions that extend across the width of the track such that the position error signal is a complementary trigonometric-compensated substantially linear function of the magnetic head position relative to the track width.

9. A disk head position control system as defined in claim 8, wherein the system further includes a digital finite impulse response filter having filter coefficients that provide filtered signal samples indicative of the servo signal amplitude having less effects due to noise and signal harmonic contents.

10. A disk head position control system as defined in claim 9, wherein the servo signal data samples produced by the filter define a signal having a constant phase error function as the servo head moves across the trigonometric-compensated stripe pattern field.

11. A disk head position control system as defined in claim 8, wherein the burst cosine phase detector multiplies the servo signal samples with a predetermined set of reference coefficients and produces a phase difference cosine term that indicates the servo head radial position.

12. A disk head position control system as defined in claim 8, wherein the servo pattern comprises a radial line pattern field and an adjacent trigonometric-compensated stripe pattern field and wherein the position error signal comprises a phase difference signal determined from the difference of the read head signal generated from the radial line pattern and the read head signal generated from the trigonometric-compensated stripe pattern.

13. A disk head position control system as defined in claim 8, further including a filter having a multiplier that receives digitized samples of the servo signal, multiplies and accumulates the signal samples with a predetermined set of filter coefficients, and produces a filtered servo signal for phase detection that is indicative of the servo signal amplitude.

14. A disk drive having:
- a magnetic storage media disk with a magnetic recording material deposited on a surface of the disk and on which is recorded at least one servo data track containing servo data comprising a repeating sequence of phase-encoded magnetic transitions defining a radial line pattern field and a trigonometric-compensated stripe pattern field;
- a magnetic head that transduces the servo data and produces a servo signal;
- a burst cosine phase detector that receives the servo signal and produces a position error signal that is a complementary trigonometric-compensated substantially linear function of the magnetic head position relative to the servo track width; and
- a servo that moves the magnetic head relative to the surface of the magnetic storage media disk in response to the position error signal.

15. A disk drive as defined in claim 14, wherein the disk drive further includes a digital finite impulse response filter having filter coefficients that provide filtered signal samples indicative of the servo signal amplitude having less effects due to noise and signal harmonic contents.

16. A disk drive as defined in claim 14, wherein the burst cosine phase detector multiplies the servo signal samples with a predetermined set of reference coefficients and produces a phase difference cosine term that indicates the servo head radial position.

17. A disk drive as defined in claim 14, wherein the servo pattern comprises a radial line pattern field and an adjacent trigonometric-compensated stripe pattern field and wherein the position error signal comprises a phase difference signal determined from the difference of the read head signal generated from the radial line pattern and the read head signal generated from the trigonometric-compensated stripe pattern.

18. A disk drive as defined in claim 17, further including a filter having a multiplier that receives digitized samples of the servo signal, multiplies and accumulates the signal samples with a predetermined set of filter coefficients, and produces a filtered servo signal for phase detection that is indicative of the servo signal amplitude, wherein the servo signal data samples produced by the filter define a signal having a constant phase error function as the servo head moves across the trigonometric-compensated stripe pattern field.

19. A disk drive as defined in claim 14, further including a filter having a multiplier that receives digitized samples of the servo signal, multiplies and accumulates the signal samples with a predetermined set of filter coefficients, and produces a filtered servo signal for phase detection that is indicative of the servo signal amplitude.

* * * * *